United States Patent [19]

Shim

[11] Patent Number: 4,481,545
[45] Date of Patent: Nov. 6, 1984

[54] STEREO APPARATUS FOR VTR WITH MONORAL AUDIO HEAD

[76] Inventor: Gregory Shim, 255-22 73rd Ave., Glen Oaks, N.Y. 11004

[21] Appl. No.: 416,583

[22] Filed: Sep. 10, 1982

[51] Int. Cl.³ ................... G11B 15/02; G11B 15/12
[52] U.S. Cl. ................................. 360/18; 360/61
[58] Field of Search ........................... 360/18, 24, 61

[56] References Cited

U.S. PATENT DOCUMENTS 3,837,003  9/1974  Justice ................................. 360/18
4,227,221 10/1980  Kawazawa ........................... 360/18

Primary Examiner—Vincent P. Canney
Attorney, Agent, or Firm—McGlew and Tuttle

[57] ABSTRACT

An apparatus for processing an audio stereo signal having left and right channels, for use with a video tape recorder having a monoral audio head comprises an analog switch assembly having an electronically controlled switch for each audio channel. A line connects the audio switch assembly to the monoral audio head and control equipment is connected to a video signal terminal of the VTR or video tape recorder. The control equipment utilizes a horizontal sync or synchronization pulse to produce a pair of complementary control pulses. The horizontal sync pulse is processed in a pulse multiplier to step up the frequency to at least twice and preferably about four times the highest audio signal frequency. By alternately controlling the electronically controllable switches to provide a sample of first one and then the other channel, a composite stereo signal can be recorded and then reproduced using the monoral audio head.

6 Claims, 8 Drawing Figures

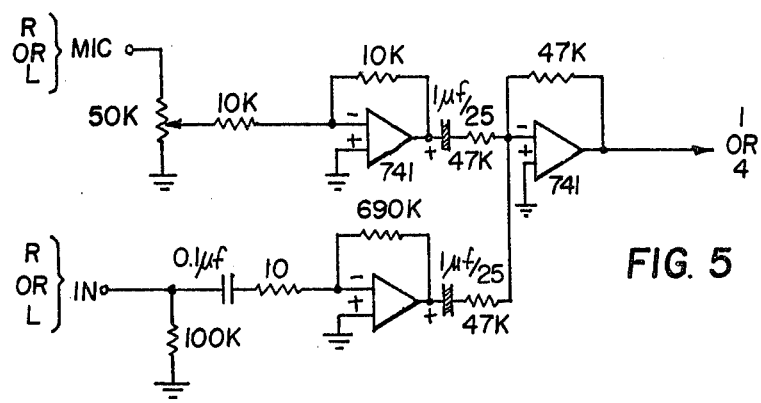
FIG. 5
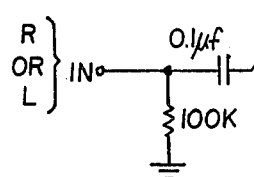
FIG. 6
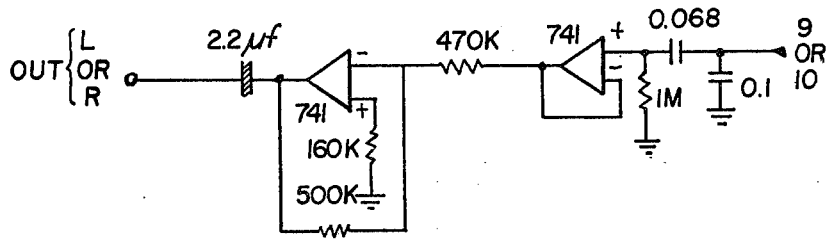
FIG. 7
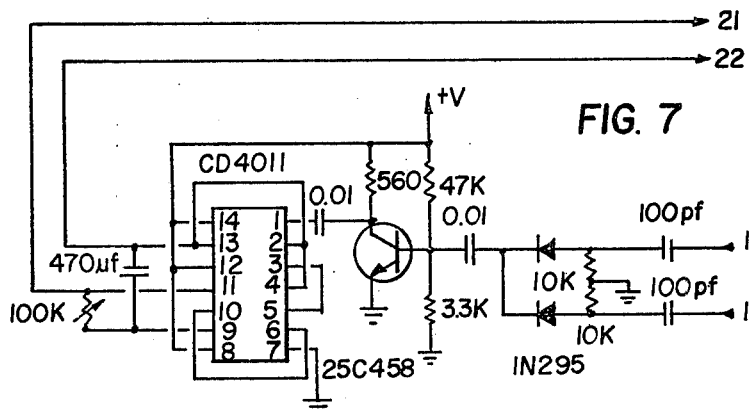
FIG. 8
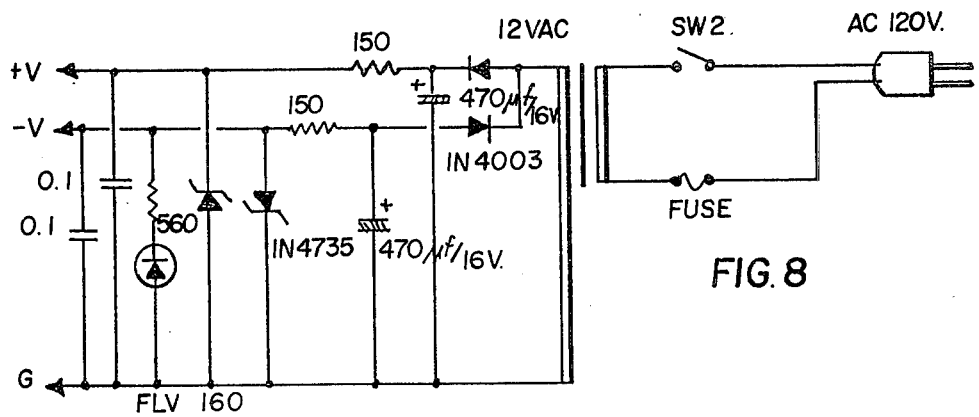

STEREO APPARATUS FOR VTR WITH MONORAL AUDIO HEAD

FIELD AND BACKGROUND OF THE INVENTION

The present invention relates in general to audio/video equipment and in particular to a new and useful apparatus which can be used to first record and then reproduce a stereo audio signal using a monoral audio head of a video tape recorder.

Most video tape recorders (VTR's) are provided with monoral audio heads that are incapable of distinguishing between the two channels of a stereo audio signal. Since stereo signals are readily available from standard stereo equipment for the recording and reproducing stereophonic sound, it would be advantageous to provide an inexpensive and simple apparatus which can record and reproduce truly stereoephonic audio signals while using the monoral audio head of a VTR.

Various approaches to the so-called multiplexing of signals is known. See for example, U.S. Pat. No. 3,375,329 to Prouty relating to the quadrophonic recording of sounds by sequentially sampling, at ultrasonic frequency, the audio output from a receiver.

U.S. Pat. Nos. 3,211,841 and 3,248,718 to Uemura et al discloses apparatus for processing plural signal outputs using a single magnetic head. This system utilizes pulse width modulation which requires a demodulation process utilizing average detection.

Another relevant reference to the present invention is U.S. Pat. No. 4,139,868 to Eisenberg which employs control pulses produced from vertical sync. pulses of the video signal to multiplex a video signal. Pulses at a very low rate of about 60 Hz are utilized for this slow rate multiplexing.

SUMMARY OF THE INVENTION

The present invention provides a scheme by which a standard VTR having a monoral magnetic audio head can be utilizd to both record and reproduce truly stereophonic audio signals having a left and a right signal portion.

According to the invention, two high frequency control pulse trains are formed utilizing one of the synchronization pulses in the video signal available from video apparatus such as a video tape recorder or a video camera. The pulse trains are utilized to control two electronically controllable switches each connected to one of the stereo channels. While one switch is closed, the other is open so that a time shared sampling from both signals is provided to the monoral audio head. The same control scheme is utilized in reproducing the stereo signal through additional electronically controllable switches.

Accordingly, an object of the present invention is to provide an apparatus for processing an audio stereo signal having left and right signal portions for use with a video tape recorder having a monoral audio head and where a video signal terminal for supplying a video signal with at least one sync pulse is available, comprising an analog switch assembly having at least two electronically controllable switches, one for the left signal portion and the other for the right signal portion, a line for connecting the two electronically controllable switches to the monoral audio head and switching control means connected to the electronically controllable switches for closing one of the switches at a time according to two control pulse trains, to pass incremental portions of the left and right signal portions, the control means adapted to be connected to the video signal terminal and be operable to produce the control pulse train from the sync pulse, the control pulse trains having a frequency at least twice the highest audio frequency of the stereo signal.

A further object of the invention is to provide two electronically controllable switches for recording and two additional switches for reproducing the stereo signal, all of the switches being controlled by the switch control means.

A still further object of the invention is to provide such an apparatus wherein a first pulse generator receives a horizontal sync pulse of the video signal and produces a first pulse train and a second inverted pulse train, a first multiplier for doubling the frequency of the pulse trains and a further signal generator for producing further pulse trains which are supplied to the electronically controllable switches.

Another object of the invention is to provide such an apparatus which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

FIG. 5 is a schematic representation of the input circuitry for the left or right audio channel;

FIG. 6 is a schematic representation of the output circuitry for the left or right video signal;

FIG. 7 is a schematic representation of the last stage in the frequency multiplying and processing portion of the invention for generating the two switch control trains; and FIG. 8 is a schematic representation of the power supply used in accordance with the invention.

DESCRIPTION OF THE PREFERRED EMBODIMENT

Figure 1:
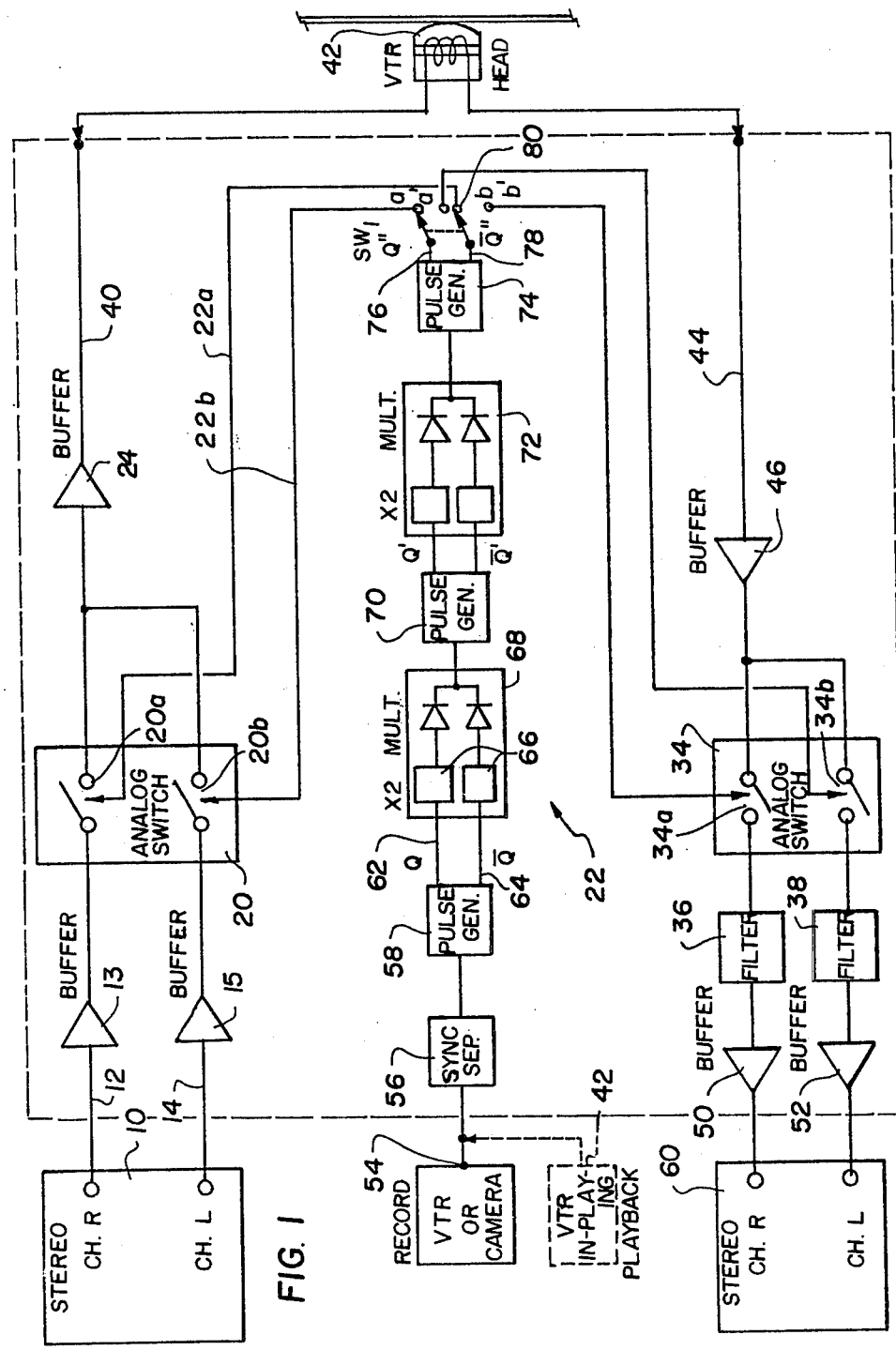
FIG. 1 is a block diagram showing the overall apparatus according to the invention.

Referring to the drawings in particular, the invention embodied therein in FIG. 1, comprises an apparatus for processing an audio stereo signal from stereo equipment 10 using a monoral audio head 42 of a video tape recorder or VTR. A right channel signal for carrying the right audio signal portion is provided over a line 12 through a buffer 13 to an analog switch assembly 20 which contains two electronically controllable switches 20a and 20b. The switching assembly 20 is provided over a line 14 and a buffer 15 with the left channel signal. Switches 20a and 20b are closed, alternately, by a control and timing circuit generally designated 22 so that at one time only the left or right signal is applied to a buffer 24, over a line 40 to the monoral audio head 42 for recording the signals. The switching frequency of the control pulses provided over lines 22a and 22b are at a frequency at least twice the highest audio frequency of the audio signal and preferably about 63 KHz. This is accomplished, as will be described in greater detail later, by multiplying one of the sync pulse signals which is provided in a video signal, by two frequency multipliers each of which multiply the signal by two.

Once a stereo audio signal has ben recorded using the monoral audio head of the VTR, the audio signal can be reproduced again using the same or a different monoral audio head. For this purpose a line 44 is provided which supplies the composite audio signal over a buffer 46 to an additional analog switch assembly 34 including its own pair of switches 34a and 34b. The switches are alternately opened and closed *by the same control and timing circuit* 22 so that once the stereo signals are separated. The left and right signals are provided over filters 36, 38 and buffers 50, 52 to the left and right audio input terminals of another stereo equipment 60. Stereo equipment 60 may be different or the same as stereo equipment 10 which was used in providing the stereo signal for recording purposes.

In other words, as shown in FIG. 1, when the inventive apparatus is used to play back the video plus audio signal, the control pulses are produced by the video signal itself on the recorded magnetic tape. This is supplied from the VTR head 42 in its "in-playing mode". The control pulse is injected into the circuit 22 as shown in FIG. 1 during a playback operation. The inventive apparatus is shown within a dash line box in FIG. 1 to distinguish it from existing video and stereo equipment.

The control circuit 22 is connected to a terminal 54 which receives a video signal, for example, from a television camera or the video tape recorder, which signal includes at least one synchronization or sync pulse, for example the horizontal sync pulse which normally has a frequency of 15.75 KHz. The horizontal sync pulse is separated in a sync separator 56 and provided to a first pulse generator 58 that produces a pulse over line 62 and an inverted pulse over line 64. These two pulse trains are supplied through differentiators 66 of a multiplier 68 which multiplies the frequency of the pulse trains by two. the pulse trains are then passed through a second pulse generator 70 and a second multiplier 72 which again steps up the frequency by a factor of 2. The third pulse generator 74 thus provides a pulse train and an inverted pulse train over lines 76 and 78 respectively to a switch 80. The pulse trains at switch 80 are at a frequency of about 63 KHz. With switch 80 in its upper position connected to terminals a, b, the control circuit 22 can be used for controlling analog switch assembly 20 to record the stereo signal. With switch 80 in its lower position connected to terminals a', b', the control circuit 22 is used to control switch assembly 34 and the sound reproducing part of the device.

Figure 2:
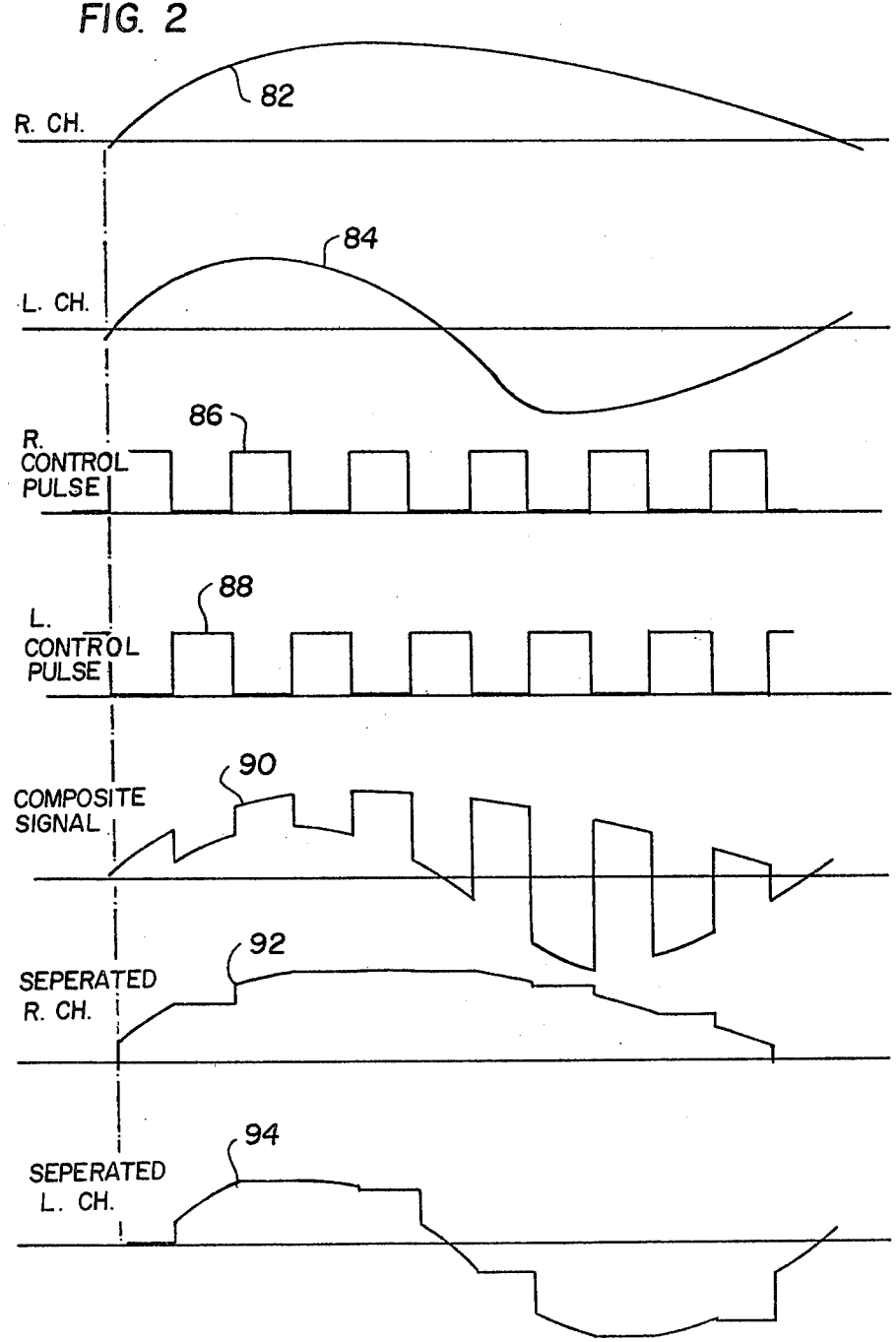
FIG. 2 is a time correlated graph showing the left and right audio signals, their control pulses, the composite signal produced therefrom and the reproduced stereo signal.

Referring to FIG. 2, the right and left stereo channels produce schematically shown signals 82 and 84. With switch 20a controlled according to the right control pulse train 86 and switch 20b controlled according to the left control pulse train 88, a composite signal 90 is provided to buffer 24. Signal 90 is the signal that is recorded on the magnetic tape by the monoral audio head 42.

To reproduce and again separate the two stereo channels, signal 90 is provided over line 44 and through buffer 46 to switch assembly 34. By utilizing control pulse trains 86 and 88, a separated right channel 92 and left channel 94 is provided to the stereo equipment 60.

Figure 3:
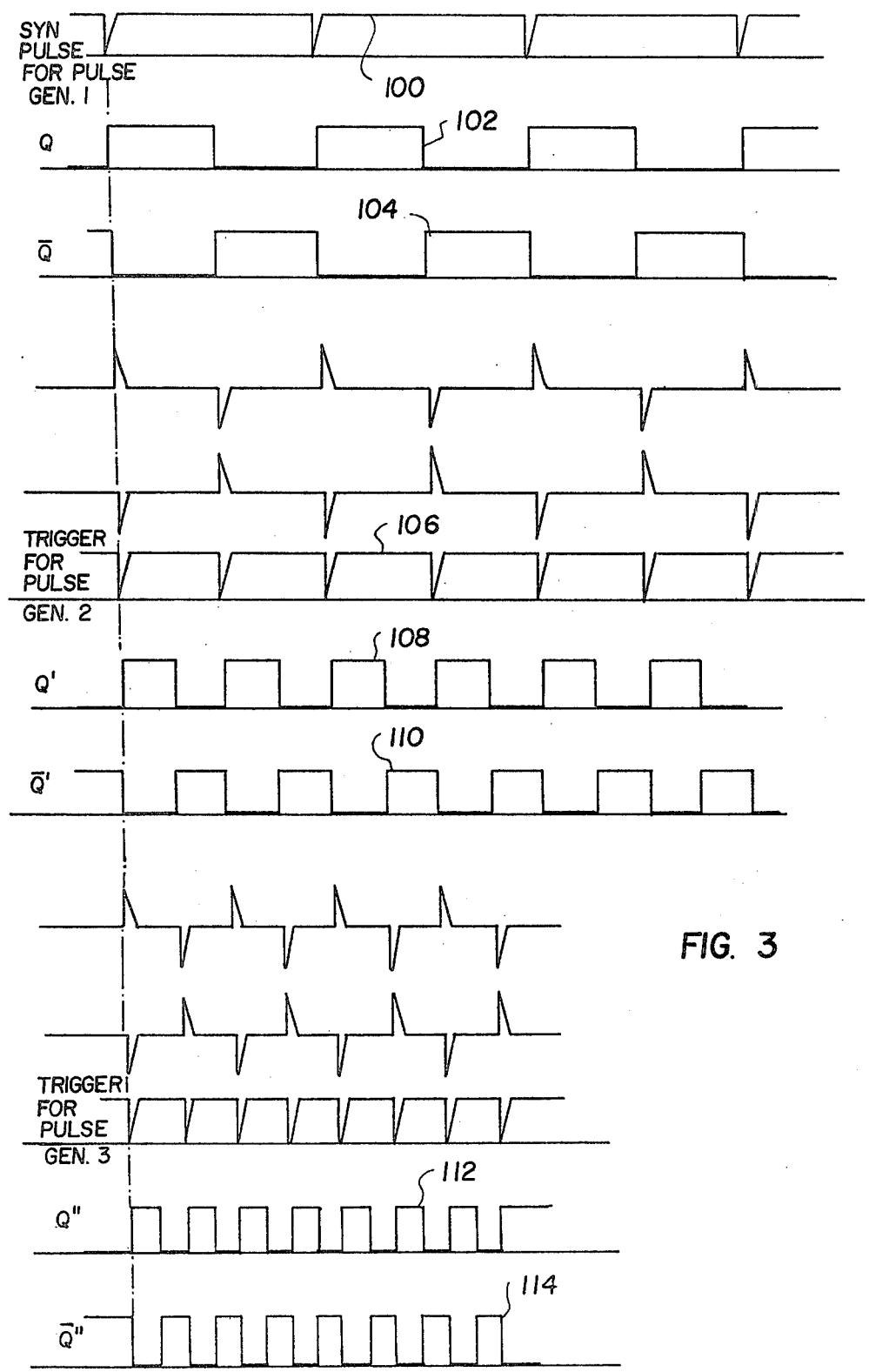
FIG. 3 is a time correlated graph showing the two switch control pulse trains as they are produced from horizontal sync pulse of the video signal according to the invention.

FIG. 3 shows how the horizontal sync pulse is utilized to produce the two control pulses over lines 76 and 78. The first pulse generator 58 receives a pulse train 100 and triggers the formation of non-inverted and inverted pulse trains 102, 104.

These are utilized in the frequency multiplier 68 to generate a triggering pulse train 106 which, in second pulse generator 70 produces non-inverted and inverted pulse trains 108, 110. The process is repeated to produce the ultimate switch controlling pulse trains 112 and 114.

Figure 4:
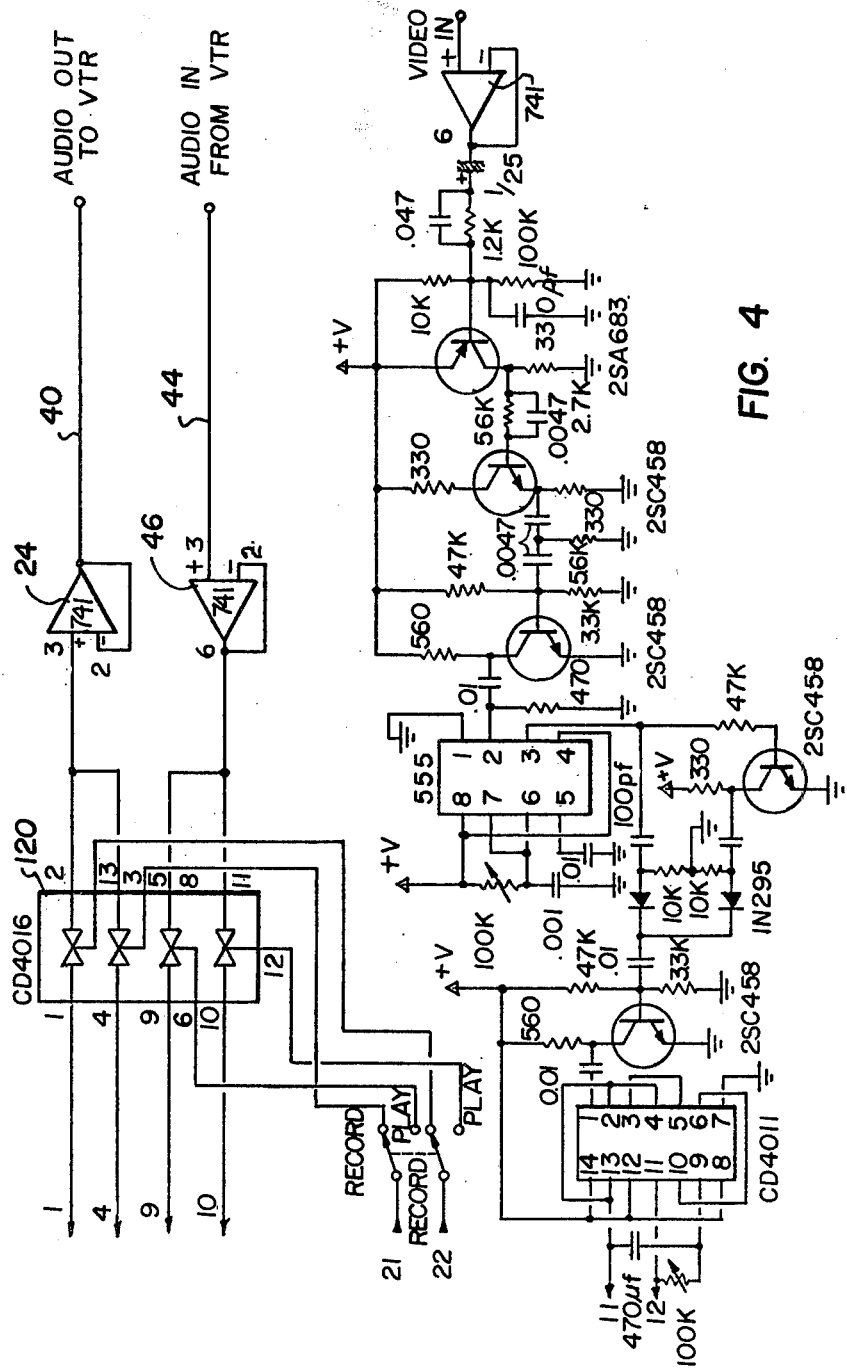
FIG. 4 is a schematic representation of some of the circuitry used in the block diagram of FIG. 1.

FIG. 4 shows a schematic of an exemplary circuit which can be utilized in achieving the invention. The electronic switch assembly 20 and 34 can be combined in a single unit 120 which for example is a CD4016 unit. Terminals 1 and 4 of this unit receive audio signals from an audio signal processor shown in FIG. 5. A circuit such as that shown in FIG. 5 is connected to the left and to the right channels of the stereo equipment. Buffers 24 and 46 can be operational amplifiers 741 with a negative feedback connection. The first and second signal generators with the first multiplier and the sync separator are shown in FIG. 4 with the third pulse generator and second frequency multiplier shown in FIG. 7.

FIG. 8 shows an exemplary power supply which can be used to power the circuit of FIGS. 4-7 as indicated.

The pulse generators are flip-flops which are triggered continuously with the trigger pulses made from the horizontal sync pulse, or which are differentiated pulses from reproduced rectangular pulses as shown in FIG. 3.

It is noted that the wave forms are exaggerated to facilitate understanding.

While a specific embodiment of the invention has been shown and described in detail to illustrate the application of the principles of the invention, it will be understood that the invention may be embodied otherwise without departing from such principles.

What is claimed is:

1. An apparatus for processing an audio stereo signal having left and right signal portions for use with a video tape recorder having a monoral audio head and where a video signal terminal for supplying a video signal including at least one sync pulse is available, comprising:

an analog switch assembly having at least two electronically controlled switches, one for the left signal portion and the other for the right signal portion;

a line for connecting said at least two electronically controlled switches to the monoral audio head; and control switch means connected to said at least two electronically controlled switches for closing one of said switches at a time according to two control pulse trains, to pass incremental portions of the left and right signal portions, said switch control means adapted to be controlled to the video signal terminal and being operable to produce said control pulse trains from the at least one sync pulse, said switch control means having at least one multiplier therein for increasing a frequency of the sync pulse so that said two control pulse trains have a frequency which is at least twice a highest audio frequency of the stereo signal.

2. An apparatus according to claim 1, wherein said switch control means comprises a sync separator adapted to be connected to the video signal terminal, the video signal having a horizontal sync pulse, said sync separator receiving the horizontal sync pulse and producing a trigger pulse train at a frequency equal to the frequency of the horizontal sync pulse, a first pulse generator connected to said sync separator for producing a non-inverted and an inverted rectangular pulse wave, at least one multiplier connected to said first pulse generator for receiving said non-inverted and inverted pulse trains and for doubling the frequency of said non-inverted and inverted pulse trains, and at least one additional pulse generator connected to said frequency multiplier for producing further non-inverted and inverted rectangular pulse trains which form said two control pulse trains for said analog switch assembly.

3. An apparatus according to claim 2, including a selector switch connected to said at least one additional pulse generator, said selected switch having a first position for connecting said at least one additional pulse generator to said analog switch assembly, a second analog switch assembly having two electronically controlled switches, one for the left portion and the other for the right signal portion, said switch having a second position for connecting said at least one additional pulse generator to said additional analog switch assembly for controlling the switching of said two electronically controlled switches of said additional analog switch assembly by said two pulse trains, said first mentioned analog switch assembly connected for receiving the left and right signal portions and said additional analog pulse assembly adapted for transmitting the left and right signal portions, and an additional line connected to said additional analog pulse assembly and adapted for connection to the monoral audio head.

4. An apparatus according to claim 3, including an additional frequency multiplier connected between said additional pulse generator and said switch, and a further pulse generator connected between said additional multiplier and said switch, said additional multiplier multiplying the frequency of pulse trains from said further pulse generator by two.

5. An apparatus according to claim 1, wherein said analog switch assembly includes four electronically controlled switches, said at least two electronically controlled switches connected for receiving the left and right signal portions and a remaining two of said electronically controlled switches connected for transmitting the left and right signal portions, an additional lines connected between said remaining two electronically controlled switches and the monoral audio head, said switch control means connected to said remaining two electronically controlled switches for controlling said remaining two electronically controlled switches according to said two control pulse trains.

6. An apparatus according to claim 5, wherein said switch control means comprises a sync separator connected to the video signal terminal, the at least one sync pulse comprising a horizontal sync pulse of the video signal, a first pulse generator connected to said sync separator for producing a non-inverted and an inverted squarewave pulse train, a first frequency multiplier connected to said first pulse generator for receiving said inverted and non-inverted pulse trains, a second frequency generator connected to said frequency multiplier for generating second non-inverted and inverted rectangular pulse trains of a frequency place that of said first mentioned non-inverted and inverted pulse trains, a second frequency multiplier connected to said second pulse generator, a third pulse generator connected to said second frequency multiplier for generating third non-inverted and inverted rectangular pulse trains comprising said two control pulse trains and a selector switch having a first position for connecting said two control pulse trains to said at least two electronically controlled switches and a second position for connecting said two control pulse trains to said remaining two electronically controlled switches.

* * * * *